Figure 1:
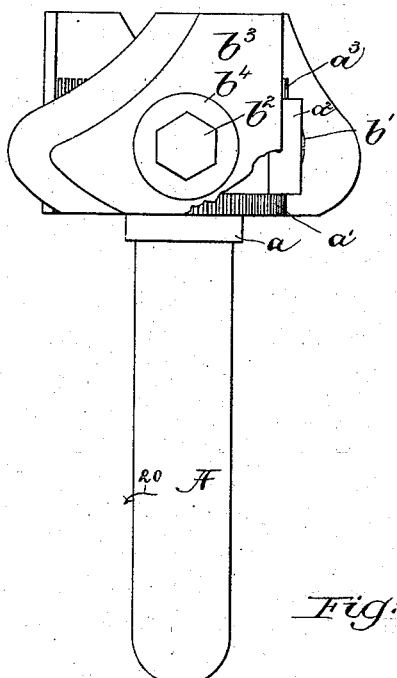

(No Model.)

H. P. FAIRFIELD.
ROTARY CUTTER.

No. 388,548. Patented Aug. 28, 1888.

Witnesses.
Howard F. Eaton.
Fred L. Emery.

Inventor.
Hadley P. Fairfield.
by Crosby & Gregory. Attys

UNITED STATES PATENT OFFICE.

HADLEY P. FAIRFIELD, OF WEST MEDFORD, ASSIGNOR TO JAMES W. BROOKS, TRUSTEE, OF CAMBRIDGE, MASSACHUSETTS.

ROTARY CUTTER.

SPECIFICATION forming part of Letters Patent No. 388,548, dated August 28, 1888.

Application filed October 31, 1887. Serial No. 253,846. (No model.)

*To all whom it may concern:*

Be it known that I, HADLEY P. FAIRFIELD, of West Medford, county of Middlesex, and State of Massachusetts, have invented an Improvement in Rotary Cutters, of which the following description, in connection with the accompanying drawings, is a specification, like letters on the drawing representing like parts.

This invention relates to rotary cutters especially adapted, among other things, to be used on machines for trimming heels of boots and shoes.

My invention has for its object to construct a rotary cutter, as will be described, whereby the knives or cutting-blades may be adjusted in unison preparatory to grinding, so that a minimum amount of grinding or sharpening of the said knives will be required to bring the cutting-edges of each knife equidistant from a common center—that is, so that each cutting-edge will be in the circumference of a circle, the radius of which is the distance from the said common center to the tip or extreme point of a knife.

My invention therefore consists, essentially, of a rotary cutter comprising a cutter-head and a cutting knife or blade attached thereto, combined with a toothed gear or plate to adjust the position of the knife or blade on the cutter-head, substantially as will be described.

Other features of my invention will be pointed out in claims at the end of this specification.

Figure 3:
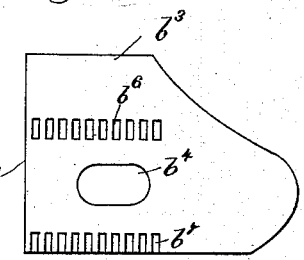
Figure 2:
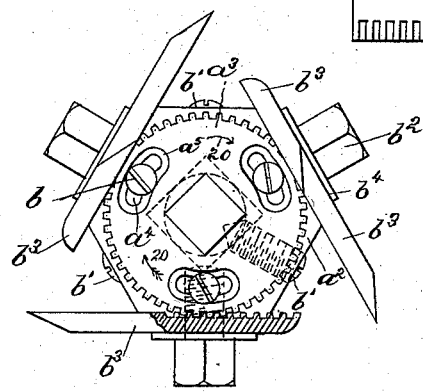

Figure 1 is a side elevation, partially broken out, of a rotary cutter embodying my invention; Fig. 2, a top or plan view of the rotary cutter, one of the knives being shown partially in section; and Fig. 3 a detail to be referred to.

Referring to Fig. 1, A represents the shaft or arbor of a boot and shoe or other machine. (Not herein shown.) The shaft A is provided, as herein shown, with a shoulder, $a$, against which bears a gear wheel or plate, $a'$, having a square or other than round hole through which the end of the shaft of corresponding shape is extended, the said gear wheel or plate being in the present instance thus made fast on the said shaft. The shaft A beyond the gear $a'$ is preferably made round to receive upon it a block, $a^2$, constituting the head of the cutter, the said block being loosely mounted upon and adapted to be turned independently of the shaft. The end of the shaft A, also made other than round, (herein shown in cross-section as square,) receives upon it a gear, $a^3$, having a central hole of like shape, thus making the gear fast upon the said shaft. The said gear $a^3$ bears against one, and the gear $a'$ against the opposite, face of the cutter-head. The gear $a^3$ is provided, as herein shown, with three slots, $a^4$, each having a shoulder or flange, $a^5$. The cutter-head $a^2$, secured to the shaft by a set-screw, $b'$, has threaded holes in line with the curved slots $a^4$ in the gear wheel or plate $a^3$, the said holes receiving the screws $b$ to thereby fasten the said gear wheel or plate to the cutter-head. The cutter-head $a^2$ is herein shown as hexagonal in shape, and to three of its sides are secured, by bolts $b^2$, cutting blades or knives $b^3$, a washer, $b^4$, being shown as interposed between the bolts and the said knives. Each cutting knife or blade $b^3$ is ground backward, as herein shown, from its inner face or side, so that when secured to the cutter-head the inner face forms the cutting-edge, the said knife or blade being ground to the shape required for the particular work to be done. Each cutting knife or blade $b^3$ is provided, as shown, with a slot, $h^4$, (see Fig. 3,) through which the bolt $b^2$ is extended loosely, which permits the blade or knife to be adjusted when the bolt is unloosened, the blade or knife at such time being free to be moved bodily forward or backward, and so also each knife or blade on its inner face is provided, as shown, with teeth $b^6 b^7$, (see Fig. 3,) with which mesh the teeth of the gear wheels or plates $a^3$ $a'$, respectively.

In operation, the knives, having been properly adjusted, are firmly fastened to the cutter-head by screwing up the bolts $b^2$, and the gear $a^3$ is fastened to the said cutter-head by the screws $b$, and the cutter-head is then fastened on the shaft or arbor by the screw $b'$. In this condition the cutter is ready for use for trimming heels of boots or shoes, or it may be employed for cutting wood or other material. When the knives have become worn and it is desired to sharpen them, all the said knives may be automatically adjusted outward together, so that minimum amount of grinding will be required on the said knives to bring the cutting-edge of each knife equidistant from the center of the shaft or arbor, and to so adjust the knives simultaneously the operator will first unloosen the bolts $b^2$ and screw $b'$ and screws $b$, and then the operator, by turning the shaft in the direction of arrow 20, will cause the gear wheels or plates $a'\,a^3$ to travel in the same direction, as shown by arrow 20 in Fig. 2. As the gear wheels or plates $a'\,a^3$ are moved in the direction of arrow 20, the teeth of the said gear wheels or plates in engagement with the teeth $b^6\,b^7$ (see Fig. 3) at the rear side of the blades or knives $b^2$ will move the said blades longitudinally and tangentially with relation to the said gear wheels or plates, thus placing the cutting edge or extreme end of each knife in the arc of a larger circle to be ground back. The knives are thus moved simultaneously, and when the ends or cutting edges are in position to be sharpened the bolts $b^2$ and screws $b'\,b$ are turned to securely fasten the parts together, and thereafter the knives are ground or otherwise sharpened the desired amount, which, on account of the nicety of adjustment, may be reduced to a minimum, thus prolonging the life of the cutter.

The cutter may be removed from the shaft of one machine—as, for instance, the trimming-machine—and placed on a similar sized shaft of another machine, which may be the grinding-machine, by unloosening the set-screws $b'$, the gear wheel or plate $a^3$, cutter-head $a^2$, and knives $b^3$ being firmly fastened together, as described, and while one cutter is being sharpened a similar cutter may be fastened onto the shaft of the trimming machine, thus accomplishing a considerable saving of time.

I have herein shown and specifically described a gear to engage teeth at the inner face of the cutting blade or knife; but I do not desire to limit myself to the exact shape of gear wheel or plate shown.

Instead of turning the shaft A and gear wheels or plates to move the knives, the said shaft may remain stationary and the cutter-head be moved.

As herein shown, the gear wheels or plates $a'\,a^3$ constitute an automatic adjusting device for the knives; but, if desired, the gear wheels or plates $a'$ may be dispensed with.

I do not herein claim, broadly, automatically adjusting the knives simultaneously.

I claim—

1. The herein-described rotary cutter comprising a cutter-head and a cutting knife or blade attached thereto, combined with a toothed gear or plate to adjust the position of the knife or blade on the cutter-head, substantially as described.

2. A rotary cutter comprising a cutter-head and two or more knives provided with teeth on their inner faces, combined with a toothed gear wheel or plate to engage the teeth on the said knives and adjust the position of the knives simultaneously, substantially as described.

In testimony whereof I have signed my name to this specification in the presence of two subscribing witnesses.

HADLEY P. FAIRFIELD.

Witnesses:
JAS. H. CHURCHILL,
F. L. EMERY.